United States Patent [19]

Carli

[11] 4,334,161

[45] Jun. 8, 1982

[54] CENTRIFUGAL SWITCH AND MOTOR CONTROL

[75] Inventor: Alvin J. Carli, Sebring, Ohio

[73] Assignee: The Alliance Manufacturing Company, Inc., Alliance, Ohio

[21] Appl. No.: 92,453

[22] Filed: Nov. 8, 1979

[51] Int. Cl.³ .......................................... H02K 11/00
[52] U.S. Cl. ................................. 310/68 E; 200/80 R
[58] Field of Search ............... 310/68 E, 76, 78, 68 R; 200/80 R

[56] References Cited

U.S. PATENT DOCUMENTS

| | | | |
|---|---|---|---|
| 2,954,224 | 9/1960 | Schneider et al. | 200/80 R X |
| 3,366,957 | 1/1968 | Carli | 200/80 R |
| 3,955,112 | 5/1976 | Sell | 310/68 E |

Primary Examiner—Donovan F. Duggan

Attorney, Agent, or Firm—Pearne, Gordon, Sessions, McCoy & Granger

[57] ABSTRACT

A centrifugal switch is used in the motor control circuit in a garage door operator. Such operator has a motor driving through a friction clutch to move the door in opening and closing directions. If an overload condition on the door is encountered, the friction clutch will slip, slowing the driven member of the friction clutch. A cantilever contact blade is connected for rotation with the clutch driven member and slows, as well as moves radially inwardly, to engage a second conductor member which is coaxial with the output of the operator. This effects a switch-closed condition which acts through a control circuit to de-energize the electric motor. The foregoing abstract is merely a resume of one general application, is not a complete discussion of all principles of operation or applications, and is not to be construed as a limitation on the scope of the claimed subject matter.

19 Claims, 4 Drawing Figures

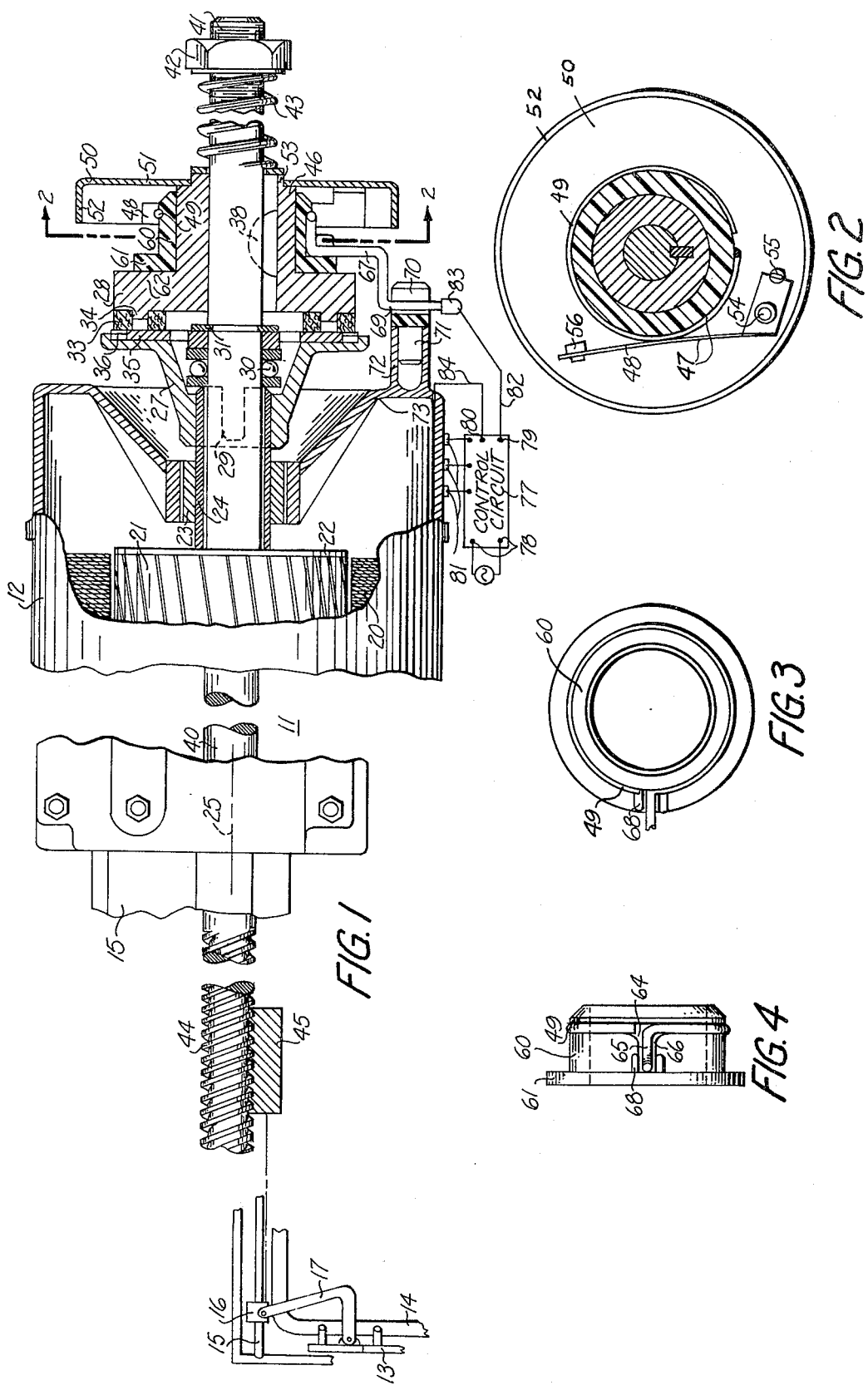

CENTRIFUGAL SWITCH AND MOTOR CONTROL

BACKGROUND OF THE INVENTION

Centrifugal switches, and even torque switches, have been previously proposed, for example, in U.S. Pat. No. 2,954,224 and 3,366,757. Such switches were ones which utilize a weight urged by a coil spring inwardly toward the axis of rotation, and, upon the rotational speed exceeding a predetermined amount, the weight would move outwardly to an open circuit condition relative to a circular, coaxial, second conductor member. Such centrifugal switches were used in connection with a garage door operator which had a cover housing, but such cover necessarily was constructed to be removable for servicing and the home owner might operate the operator with such cover removed. With continued emphasis on safety, it is now recognized that these switch mechanisms are capable of being exposed and, hence, capable of being knocked out of adjustment or of causing injury due to the rotating switch parts. Additionally, the weights acted on by centrifugal force which comprise a part of the switch mechanism might be subject to contact bounce as the switch accelerates or decelerates through the given speed of operation between opening and closing switch conditions. This contact bounce could be an undesirable condition in providing two rather than one changes of door operating conditions in providing indefinite changes of switch conditions.

SUMMARY OF THE INVENTION

The problem to be solved, therefore, is how to construct a centrifugal switch or torque switch which overcomes the potential deficiencies of the prior art switches. This problem may be solved by a centrifugal switch for use with a frame comprising, in combination, a rotatable member having an axis of rotation, first and second coacting conductor members in said centrifugal switch, said second conductor member being substantially circular and coaxial with said axis, said first conductor member including a cantilever spring blade secured for rotation with said rotatable member, and weight means acting on the outboard end of said cantilever blade whereby upon rotation of said rotatable member at a predetermined speed the weight means urges said cantilever blade out of engagement with said second conductor member and whereby when said rotatable member is rotating at less than said predetermined speed said cantilever blade engages said second conductor member as a switch-closed condition.

The problem also may be solved by a motor control circuit comprising, in combination, an electric motor having a stator and a rotor, an output shaft coaxial with said rotor and connected for rotation with said rotor, a centrifugal switch having first and second conductor members, said second conductor member being substantially circular and coaxial with said axis, said first conductor member including a centilever spring blade secured for rotation with said output shaft and disposed to coact with said second conductor member, weight means acting on the outboard end of said cantilever blade whereby upon rotation of said output shaft at a predetermined speed the weight means urges said cantilever blade out of engagement with said second conductor member and whereby when said output shaft is rotating at less than said predetermined speed said cantilever blade engages said second conductor member as a switch-closed condition, and means connecting said switch to control said motor.

An object of the invention is to provide a centrifugal switch mechanism which is rugged, simple, and dependable.

Another object of the invention is to provide a torque switch mechanism which may be incorporated in conjunction with a friction clutch.

Another object of the invention is to provide a centrifugal switch incorporated in an electric motor drive to a load through a friction clutch.

Still another object of the invention is to provide a centrifugal switch mechanism which is simply provided by a cantilever-mounted contact blade.

Another object of the invention is to provide a centrifugal switch with a bare minimum of parts and a concomitant minimum assembly time.

Other objects and a fuller understanding of the invention may be had by referring to the following description and claims, taken in conjunction with the accompanying drawing.

BRIEF DESCRIPTION OF THE DRAWING

FIG. 1 is a combined schematic diagram and longitudinal sectional view through a motor switch mechanism embodying the invention;

FIG. 2 is a sectional view on line 2—2 of FIG. 1;

FIG. 3 is an end elevational view of the non-rotating part of the switch mechanism as removed from the assembly of FIG. 1; and FIG. 4 is a side elevational view of the switch part of FIG. 3.

DESCRIPTION OF THE PREFERRED EMBODIMENT

The invention may be incorporated in connection with a motor 12. This motor may drive some kind of load and, by way of example, it may be used with a garage door operator 11 operating through linkage means to open and close a door 13. The door has been shown as an overhead type of garage door which may move upwardly on a track 14 to an open position and downwardly to a closed position. A guideway 15 may guide movement of a carriage 16, which moves longitudinally thereof and parallel to at least part of the motion of the door. Movement of the carriage 16 through a link 17 causes opening and closing movements of the door 13.

The motor 12 has a stator 20 and a rotor 21, with a first end 22 of the rotor 21 being at the right end of the view of FIG. 1. The rotor 21 is journaled by bearings, including the bearing 23, and the entire rotor 21 is fixed on a hollow shaft 24 which has a rotational axis 25. A friction clutch includes a circular drive member 27 and a driven member 28. The drive member 27 is secured to the end of the hollow shaft 24, such as by being pressed onto this shaft or, as shown, by an interfitting key and slot connection 29. A thrust bearing 30 is held in place by a C-ring 31 to locate the position of the clutch drive member 27.

A clutch facing 33 is provided between the drive and driven members 27 and 28, and, as shown, this is a washer-shaped clutch facing having apertures slidably received on bosses 34 on the driven member 28 for rotation of the clutch facing 33 with the driven member 28. The cooperating face of the drive member 27 is of a material to frictionally coact with the clutch facing 33 and, as shown, this is a washer-shaped, hard metal disc 35 secured in a suitable manner, such as by staking 36, to the drive member 27. The drive member 27 may be of a metal suitably soft to provide this staking, such as cast zinc or cast aluminum. The driven member 28 may be of sintered metal and secured by a key 38 to an output worm shaft 40. This key 38 connects the driven member 28 to the worm shaft 40 for rotation of the shaft 40, but permits small longitudinal movement of the driven member 28 as the clutch facing 33 wears. The distal end 41 of the worm shaft 40 is threaded at 41 to receive a nut 42 which variably compresses a spring 43 acting against the outer end of the clutch driven member 28. This force is taken by a thrust bearing within the motor 12 and provides the urging force between the drive and driven clutch members 27 and 28.

The output worm shaft 40 has threads 44 engageable by a partial nut 45 which may be slidable in the guideway 15 and the nut may be connected by linkage to move the carriage 16 along this guideway 15.

The clutch driven member 28 has an extended hub 46 which may be considered a rotatable member of a centrifugal switch 47. This switch includes first and second conductor members 48 and 49. The first conductor member 48 includes the metallic clutch driven member 28 plus a cap 50 which has a disc-like radial portion 51 and a longitudinally extending cup wall 52. This cup 50 is secured for rotation with the driven member 28 by having the extended hub 46 peened over at 53. The first conductor member 48 is shown in this embodiment as a cantilever-mounted metal blade with the proximal end riveted at 54 to the cup disc portion 51 and a tab 55 extending into an aperture in the disc portion 51. The distal end of the cantilever blade 48 carries a weight 56 which is acted on by centrifugal force as the driven member 28 and cup 50 rotate.

An insulator hub 60 is rotatably journaled on the extended hub 46 of the clutch driven member 28 for relative rotation therebetween. The insulator hub 60 has a flange portion 61 adjacent a flange portion 62 of the driven member 28. This flange portion 62 provides a longitudinal shoulder to restrict motion to the left of the insulator hub 60 as viewed in FIG. 1 and the cup disc portion 51 provides another longitudinal shoulder to restrict motion to the right of this insulator hub 60. The second conductor member 49 is a conductor wire which is disposed in a peripheral groove 64 on the insulator hub 60. This peripheral groove 64 has an outboard shoulder to restrain the conductor wire 49 from moving longitudinally to the right as viewed in FIG. 1. The conductor wire 49 also has a longitudinal extension 65 lying in a longitudinal groove 66, and a radial extension 67 lying between two radial lips 68 on the insulator hub flange portion 61. These lips 68 make the conductor wire 49 non-rotative relative to the insulator hub 60. Also, the radial extension 67 bearing against the flange portion 61 restrains this conductor member from longitudinal movement to the left as viewed in FIG. 1, and the wire 49 lying in the peripheral groove 64 restrains the wire from any longitudinal movement. The conductor wire 49 has a further radial extension 69 which is disposed between a fork 70 of an insulator plug 71 which is pressed into an aperture 72 on the stationary end bell 73 of the motor 12.

FIG. 1 shows an electrical control circuit 77 which has voltage source input terminals 78 and control terminals 79 and 80. The electrical control circuit 77 is also connected to the motor 12 by energization conductors 81 to supply energization for forward and reverse conditions of the motor 12. The control terminal 79 is connected by a conductor 82 to a terminal 83 at the outer end of the conductor wire 49 and the control terminal 80 is connected by a conductor 84 to be grounded to the frame of the motor 12 at any convenient location. The control circuit 77 may be similar to that shown in U.S. Pat. No. 4,119,896, issued Oct. 10, 1978.

OPERATION

The electrical control circuit 77 may be controlled in any suitable manner to provide energization to the motor 12 to either raise or lower the door 13. FIG. 1 shows the door closed and, upon energization of the motor 12 to raise the door, the motor, as it comes up to speed, causes opening of the torque switch or centrifugal switch mechanism 47. This conveniently may be at about one-half the normal running speed of the motor 12. The clutch 27, 28 is adjustable so as to the torque condition under which it will slip by variable compression of the spring 43, adjusted by the longitudinal position of the nut 42. Generally, the clutch will be adjusted to move the door under normal operating conditions but to slip upon a definite overload so that should the door strike some obstacle, or the up or down physical travel limits, the clutch will slip. Under such conditions, with the door stalled, this stops the worm 40 and driven clutch plate member 28. As this member 28 slows to a stalling point, some predetermined rotational speed will be reached, for example, about one-half motor speed, to close the torque switch or centrifugal switch mechanism 47. At full speed of the motor, the weight 56 will be forced centrifugally outwardly against the cantilever spring urging of the blade 48. Then, upon deceleration, the weight 56 will be urged inwardly by this cantilever blade to engage the outer periphery of the conductor wire 49. This conductor wire 49 and the insulator hub 60 are kept stationary to the radial extension 69 and the insulator plug 71. Accordingly, the hub 46 of the clutch driven member 28 rotates inside of the insulator hub 60. When the cantilever blade 48 engages the outer periphery of the conductor wire 49, this provides a ground connection for the cantilever blade 48, which conditions the control circuit 77 to de-energize the motor 12. Thus, the use of this torque switch mechanism 47 promptly de-energizes the motor 12, and prevents the motor from being overloaded by the stalled condition of the door 13.

The clutch 27, 28 and the centrifugal switch 47 are constructed from simple parts economical to manufacture and economical to assemble. The metal cup 52 has no re-entrant portions, and, hence, may be a simple stamped or drawn metal cup, for example, from aluminum. The clutch driven member 28 may be made from a sintered metal part so that it may be oil-impregnated for good lubricating properties rotating relative to the insulator hub 60. This clutch driven member 28 has no undercuts, so it may be made in a simple two-part mold. Also, the clutch drive member 27 may be cast zinc or cast aluminum and, again, has no undercuts, so that it may be made in a simple two-part die. The insulator hub 60 may be made in a two-part mold, with the parting line along the plane of the paper of FIG. 4, in order to form the peripheral groove 64, the longitudinal groove 66, and the radial lips 68, and the mold may also have a loose piece to form the longitudinal aperture within the insulator hub 60.

Because the conductor wire 49 is not a full 360-degree annular ring, it may be relatively easily installed on the insulator hub 60 by slightly springing open the ring portion of this conductor wire to snap it into the peripheral groove 64 and the longitudinal groove 66, with the radial extension 67 lying between the lips 68. This insulator hub 60 then may be longitudinally slipped over the clutch driven member hub 46, slightly spreading outwardly the cantilever blade 48 during this longitudinal movement, the cup 50 put in place, and then the hub 46 peened over at 53. The mounting of the cantilever blade at rivet 54 and tab 55 on the cup 50 establishes a slight inward bias on the cantilever blade 48 during at-rest conditions so that there is an electrically closed condition between this blade 48 and the conductor wire 49. The cup wall 52, being cylindrical, provides good protection for the centrifugal or torque switch 47, even should a cover housing (not shown) be removed from the rear of this garage door operator 11. Even when the operator is running, this rotating cup 50 will prevent injury to a mechanic servicing the operator, and will also provide protection to the centrifugal switch 47, so that it is knocked out of adjustment. When the clutch driven member 28 together with the insulator hub 60 and cup 50 are longitudinally assembled onto the output worm shaft 40, the conductor wire radial extension 69 merely longitudinally slips between the fork 70 of the insulator plug 71 to hold stationary or non-rotating the second conductor member 49 and the insulator hub 60, even though the clutch driven member 28 rotates. Adding the spring 43 and the nut 42 will complete the assembly of the clutch and centrifugal switch 47.

Even though the conductor wire 49 is not a complete 360-degree circle, it is almost 360 degrees of the periphery of the insulator hub 60, so that the cantilever blade 48, as it rotates, will contact this conductor wire 49 throughout a full 360-degree rotation, so long as the rotational speed of the cantilever blade is below the switch actuating condition.

The cantilever blade is mounted for rotation within the longitudinal confines of the metal cup 50 for good protection of personnel around the operator 11 and for good protection against maladjustment of the centrifugal switch 47.

The cup wall 52 also protects the cantilever blade 48 from moving so far outwardly under centrifugal force that the elastic limit of this blade is exceeded. This is another protective feature of the cup wall 52. The cup 50, being open toward the left of FIG. 1, permits visual inspection of the proper position and operation of the cantilever blade 48 relative to the conductor wire 49.

The present disclosure includes that contained in the appended claims, as well as that of the foregoing description. Although this invention has been described in its preferred form with a certain degree of particularity, it is understood that the present disclosure of the prefrred form has been made only by way of example and that numerous changes in the details of construction and the combination and arrangement of parts may be resorted to without departing from the spirit and scope of the invention as hereinafter claimed.

What is claimed is:

1. A centrifugal switch for use with a frame comprising, in combination,
a rotatable member having an axis of rotation,
first and second coacting conductor members in said centrifugal switch,
said second conductor member including a substantially circular portion coaxial with said axis,
said first conductor member including a spring blade,
said spring blade being long relative to the width thereof and wide relative to the thickness thereof,
means mounting said spring blade near one end thereof for rotation with said rotatable member and mounting weight means near the other end thereof to have the spring blade act as a cantilever spring blade whereby upon rotation of said rotatable member at a predetermined speed the weight means urges said cantilever blade out of engagement with said second conductor member and whereby when said rotatable member is rotating at less than said predetermined speed said cantilever blade engages said second conductor member as a switch-closed condition.

2. A centrifugal switch as set forth in claim 1, including a friction clutch having drive and driven members, means interconnecting said friction clutch between an input member and said rotatable member,
and said cantilever spring blade being secured for rotation with said clutch driven member to be actuated to a switch-closed condition upon a given amount of slipping of said friction clutch.

3. A centrifugal switch as set forth in claim 1, including an insulator hub on said rotatable member,
said substantially circular portion of said second conductor member encircling at least a majority of said insulator hub,
and said cantilever blade being positioned to engage said encircling portion of said second conductor member.

4. A centrifugal switch as set forth in claim 3, including means to hold said encircling portion non-rotative.

5. A centrifugal switch as set forth in claim 1, including an insulator hub journaled on said rotatable member for relative rotation therebetween,
a longitudinal shoulder on said insulator hub,
a metallic conductor wire disposed approximately 360° around said insulator hub adjacent said longitudinal shoulder as part of said second conductor member,
and said cantilever blade being positioned to make and break contact with said conductor wire.

6. A centrifugal switch as set forth in claim 1, including a cup secured for rotation with said rotatable member,
and said cantilever blade being mounted for rotation within the longitudinal confines of said cup.

7. A centrifugal switch as set forth in claim 6, wherein said cantilever blade is secured to said cup.

8. A centrifugal switch as set forth in claim 7, including an insulator hub on said rotatable member, means mounting said second conductor member on said insulator hub, and a portion of said cup forming a longitudinal shoulder to aid in retaining said insulator hub longitudinally in place on said rotatable member.

9. A motor control circuit comprising, in combination,
an electric motor having a stator and a rotor,
an output shaft coaxial with said rotor and connected for rotation with said rotor,
a centrifugal switch having first and second conductor members,
said second conductor member being substantially circular and coaxial with said axis,
said first conductor member including a cantilever spring blade secured for rotation with said output shaft and disposed to contact said second conductor member, weight means acting on the outboard end of said cantilever blade whereby upon rotation of said output shaft at a predetermined speed the weight means urges said cantilever blade out of engagement with said second conductor member and whereby when said output shaft is rotating at less than said predetermined speed said cantilever blade engages said second conductor member as a switch-closed condition, and means connecting said switch to control said motor.

10. A motor control circuit as set forth in claim 9, including a friction clutch having drive and driven members interconnected between said rotor and said output shaft, and said cantilever blade being mounted for rotation in accordance with rotation of said driven member of said friction clutch.

11. A motor control circuit as set forth in claim 9, including a friction clutch having drive and driven members, means connecting said friction clutch between said rotor and said output shaft, means urging said clutch members together for transmission of torque therethrough, and said cantilever blade being connected for rotation with said driven clutch member to be actuated to a switch-closed condition upon a given amount of slipping of said friction clutch.

12. A motor control circuit as set forth in claim 9, including a rotatable substantially cylindrical protective wall encircling said cantilever blade.

13. A motor control circuit as set forth in claim 9, wherein said centrifugal switch includes an insulator hub on said output shaft, a longitudinal shoulder on said insulator hub, and said second conductor member being a metallic conductor wire disposed approximately 360° around said insulator hub adjacent said longitudinal shoulder.

14. A motor control circuit as set forth in claim 13, including insulating means secured to said motor stator to secure said conductor wire against rotation with said output shaft, and said cantilever blade disposed to electrically contact the entire periphery of said metallic conductor wire during rotation of said first conductor member at less than a given rotational speed.

15. A motor control circuit as set forth in claim 13, including first and second longitudinal shoulders rotatable with said output shaft and cooperable with said insulator hub to restrain longitudinal movement of said insulator hub relative to said output shaft.

16. A centrifugal switch as set forth in claim 1, wherein said substantially circular portion of said second conductor means is both a physical mount for said second conductor means and a contact portion coacting with said first conductor means.

17. A centrifugal switch as set forth in claim 1, including insulation means relatively insulating said first and second conductor members, and means mounting said substantially circular portion of said second conductor means on said insulation means to establish physical support of said second conductor means and also establish said substantially circular portion of said second conductor means in a position slidably contacted by said first conductor means at speeds less than said predetermined speed.

18. A centrifugal switch as set forth in claim 1, including an insulator hub on said rotatable member relatively insulating said first and second conductor members, a peripheral groove in said insulator hub, and said substantially circular portion of said second conductor means being mounted in said groove for support.

19. A centrifugal switch as set forth in claim 18, wherein the outer periphery of said substantially circular portion has sliding contact with said first conductor means at speeds less than said predetermined speed for self-cleaning of such contact periphery and first conductor means.

* * * * *